US012501264B2

(12) United States Patent
Sikes et al.

(10) Patent No.: US 12,501,264 B2
(45) Date of Patent: Dec. 16, 2025

(54) SEAMLESS PERSONAL HOTSPOT CONNECTIVITY VIA PERSONAL HOTSPOT TOKENS

(71) Applicants: AT&T Intellectual Property I, L.P., Atlanta, GA (US); AT&T Mobility II LLC, Atlanta, GA (US)

(72) Inventors: Jason Sikes, Carnation, WA (US); Todd Wallace, Hamilton, MT (US); Matthew Wallace, Colleyville, TX (US); Arnold Schrider, Mercer Island, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 559 days.

(21) Appl. No.: 17/898,517

(22) Filed: Aug. 30, 2022

(65) Prior Publication Data
US 2024/0073689 A1 Feb. 29, 2024

(51) Int. Cl.
*H04M 1/68* (2006.01)
*H04M 3/16* (2006.01)
*H04W 12/069* (2021.01)
*H04W 12/08* (2021.01)
*H04W 84/12* (2009.01)
*H04W 88/04* (2009.01)

(52) U.S. Cl.
CPC ......... *H04W 12/069* (2021.01); *H04W 12/08* (2013.01); *H04W 84/12* (2013.01); *H04W 88/04* (2013.01)

(58) Field of Classification Search
CPC .... H04W 12/069; H04W 12/08; H04W 84/12

USPC ......................................................... 455/410
See application file for complete search history.

(56) References Cited

U.S. PATENT DOCUMENTS

| | | | |
|---|---|---|---|
| 8,228,861 B1 * | 7/2012 | Nix | H04L 65/1069 370/329 |
| 8,392,971 B1 * | 3/2013 | Kates | G06F 21/34 713/168 |
| 9,112,849 B1 * | 8/2015 | Werkelin Ahlin | H04L 63/10 |
| 2008/0014867 A1 * | 1/2008 | Finn | G06K 7/0008 455/41.1 |

(Continued)

*Primary Examiner* — Marceau Milord
(74) *Attorney, Agent, or Firm* — Hartman & Citrin LLC (57) ABSTRACT

Concepts and technologies are disclosed herein for seamless personal hotspot connectivity via personal hotspot tokens. According to one aspect disclosed herein, a personal hotspot-enabled device can include a processor and a memory. The memory can store instructions of an operating system and a personal hotspot application. The personal hotspot-enabled device can receive a personal hotspot token. The personal hotspot application can recognize, via a short-range communication component, a device identification associated with a peripheral device operating in proximity to the personal hotspot-enabled device. The personal hotspot application can request the personal hotspot token from the operating system. The personal hotspot application can inform the operating system of the device identification. The personal hotspot application can then receive the personal hotspot token associated with the device identification. The operating system can create a personal hotspot. The operating system can automatically authenticate the peripheral device to connect to the personal hotspot.

17 Claims, 6 Drawing Sheets

(56) References Cited

U.S. PATENT DOCUMENTS

| | | | |
|---|---|---|---|
| 2009/0186575 A1* | 7/2009 | Cedo Perpinya | H04L 67/306 455/41.2 |
| 2012/0142271 A1* | 6/2012 | Zhodzishsky | H04L 67/303 710/313 |
| 2013/0054803 A1* | 2/2013 | Shepard | G06F 21/6281 709/225 |
| 2013/0244784 A1* | 9/2013 | Assa | G06F 3/0416 463/40 |
| 2014/0059443 A1* | 2/2014 | Tabe | H04L 51/52 715/738 |
| 2015/0124791 A1* | 5/2015 | Mazandarany | H04W 12/04 370/338 |
| 2015/0215974 A1* | 7/2015 | Cloutier | H04W 84/105 455/405 |
| 2015/0250021 A1* | 9/2015 | Stice | H04W 8/20 710/16 |
| 2015/0271557 A1* | 9/2015 | Tabe | H04N 21/6131 725/62 |
| 2016/0081134 A1* | 3/2016 | Chow | G06F 16/337 455/419 |
| 2017/0006654 A1* | 1/2017 | Stice | H04W 88/04 |
| 2017/0094697 A1* | 3/2017 | Zdepski | H04L 67/54 |
| 2017/0265107 A1* | 9/2017 | Hicks | H04W 28/0236 |
| 2018/0115892 A1* | 4/2018 | Kotay | H04W 12/04 |
| 2018/0216946 A1* | 8/2018 | Gueye | G01C 21/3617 |
| 2019/0045034 A1* | 2/2019 | Alam | H04L 67/303 |
| 2019/0095607 A1* | 3/2019 | Howard | G06F 21/41 |

\* cited by examiner

SEAMLESS PERSONAL HOTSPOT CONNECTIVITY VIA PERSONAL HOTSPOT TOKENS

BACKGROUND

Extended reality and other emerging device products typically connect via home WI-FI. As these products continue to advance, use and use cases will move beyond the home, increasing the need for mobile connectivity. These extended reality and other emerging device products typically have form factors that are not conducive to the inclusion of antenna and modem components that are required for mobile connectivity. Cost, power consumption, heat dissipation, form factor implications, and power versus radiation requirements are among the chief limitations. The convergence of extended reality and other emerging device products that need mobile connectivity with the limitations of a cellular-capable product drives the ecosystem to rely on the mobile connectivity provided by smartphones to provide a "personal hotspot" ("PHS") through which the extended reality and other emerging device products can connect via WI-FI. Today, the user experience for connecting a device to a smartphone's personal hotspot is cumbersome at best. Moreover, in some use cases, the extended reality or other emerging device product does not have a user interface or other means to select a network and/or input security credentials such as a password. This further complicates the process of setting up a PHS to utilize devices that do not have built-in mobile connectivity.

SUMMARY

Concepts and technologies are disclosed herein for seamless PHS connectivity via PHS tokens. According to one aspect disclosed herein, a PHS-enabled device can include a processor and a memory. The memory can store instructions of an operating system and a PHS application. The PHS-enabled device can receive a PHS token. The PHS application can recognize, via a short-range communication component, a device identification associated with a peripheral device operating in proximity to the PHS-enabled device. The PHS application can request the PHS token from the operating system. The PHS application can inform the operating system of the device identification. The PHS application can receive the PHS token from the operating system. The operating system can create, via a PHS function, a PHS. The operating system can automatically authenticate the peripheral device to connect to the PHS using authentication credentials provided in the PHS token.

In some embodiments, the PHS token is specific to the peripheral device. In other embodiments, the PHS token is specific to an original equipment manufacturer ("OEM") associated with the peripheral device. In some embodiments, the peripheral device is an extended reality ("XR") device such as a virtual reality device, an augmented reality device, or a mixed reality device. In some embodiments, the peripheral device is a device with a limited input capability. For example, a limited input capability may prevent a user from selecting the personal hotspot from a list of one or more available WI-FI networks and providing one or more authentication credentials (e.g., a password) to access the PHS. Alternatively, for example, the limited input capability may otherwise hinder the user's ability to select the PHS and provide the authentication credential(s). More particularly, the peripheral device might not have a user-facing input component such as a touchscreen or physical keyboard, and thus may be considered to have limited input capability.

In some embodiments, the PHS-enabled device can receive the PHS token in accordance with a personal hotspot agreement. The PHS agreement may be between a mobile network operator that serves, at least in part, the PHS-enabled device and a peripheral device provider associated with the peripheral device. The peripheral device provider may be an OEM of the peripheral device, although other entities may serve in this capacity.

In some embodiments, the user may be required to approve automatic authentication to allow the peripheral device to connect to the PHS. For example, the operating system may prompt the user to provide an approval via the PHS-enabled device to allow the peripheral device to access the PHS. In response to receiving the approval, the operating system can then create, via the PHS function, the PHS, and automatically authenticate the peripheral device to connect to the PHS.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description be within the scope of this disclosure.

DETAILED DESCRIPTION

The concepts and technologies disclosed herein provide seamless PHS connectivity via PHS application tokens. More particularly, the concepts and technologies disclosed herein provide a mechanism for the mobile network operator to authorize a seamless PHS connection for pre-authorized extended reality and other emerging device products. In brief, the mobile network operator can pre-authorize a new personal hotspot application token for a specific application and/or device product (e.g., OCULUS, available from META), the mobile network operator can provide the new PHS token to the device operating system via a network-to-device communication protocol, and the device operating system can allow the seamless PHS connection for the specific extended reality or other emerging device product associated with the PHS token. The number of personal tokens can be n+1, for many connected devices. The concepts and technologies disclosed herein will greatly improve the PHS experience for the user.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
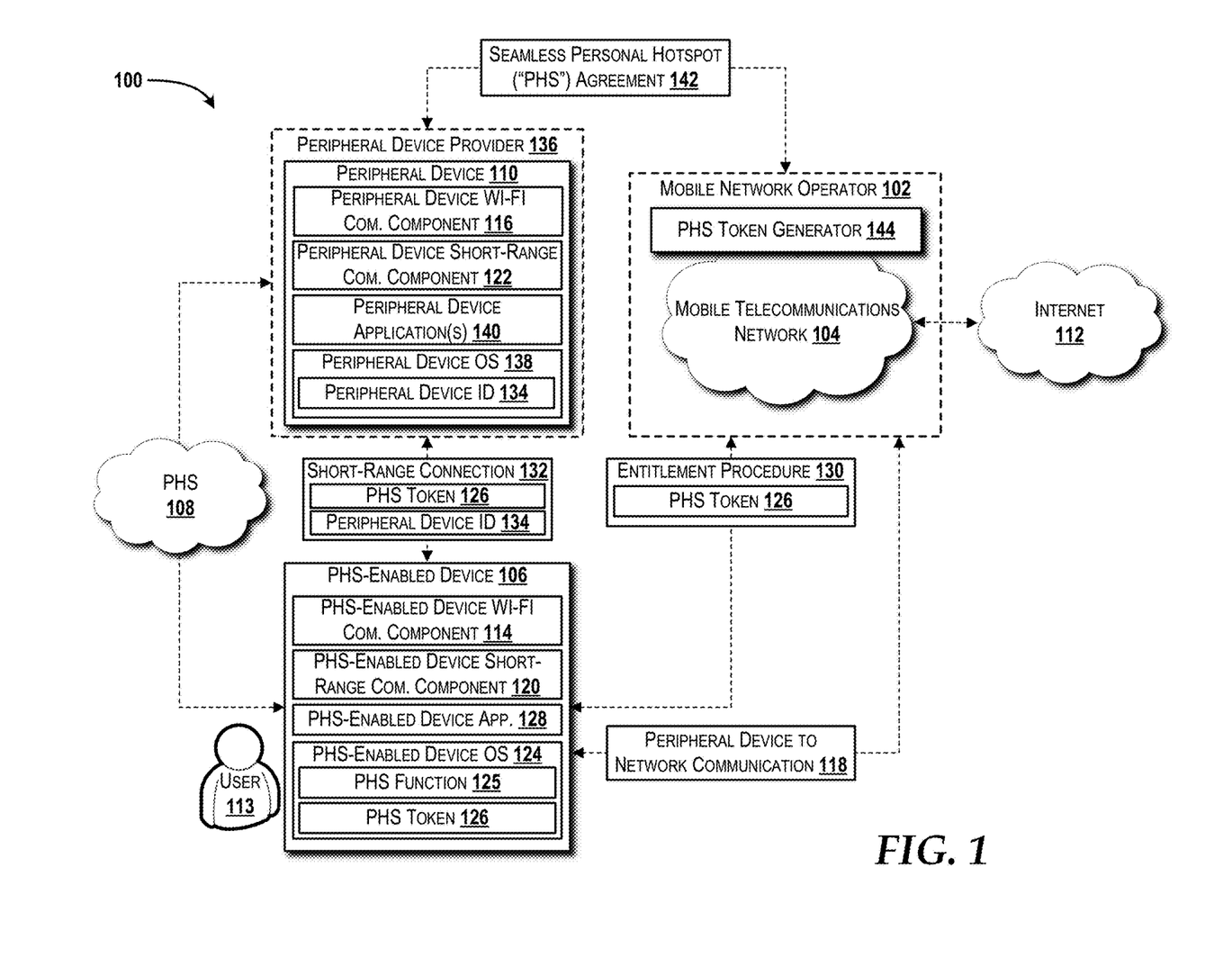
FIG. 1 is a system diagram illustrating an illustrative operating environment for various embodiments of the concepts and technologies described herein.

Referring now to FIG. 1, aspects of an operating environment 100 in which various embodiments of the concepts and technologies disclosed herein can be implemented will be described, according to an illustrative embodiment. The illustrated operating environment 100 includes a mobile network operator 102 that provides, at least in part, a mobile telecommunications network 104. The mobile telecommunications network 104 can provide network connectivity to a plurality of devices, such as a personal hotspot-enabled device 106 ("PHS-enabled device 106") in the illustrated example. The PHS-enabled device 106 can create a personal hotspot ("PHS") 108 through which a peripheral device 110 can connect to the mobile telecommunications network 104, and in turn, one or more other networks such as the Internet 112 to access one or more services (not shown).

The functionality of the PHS-enabled device 106 may be provided by a smartphone, a tablet/slate computer, a laptop computer, a vehicle computing system, a video game system, other computing systems/devices, and/or the like. The illustrated PHS-enabled device 106 will be described as a smartphone or other handheld device that is capable of creating the PHS 108. The functionality of the peripheral device 110 may be provided by a device that does not have native mobile network connectivity (e.g., to connect to the mobile telecommunications network 104). In some embodiments, the peripheral device 110 is an extended reality ("XR") device such as a virtual reality ("VR") device, an augmented reality ("AR") device, or a mixed reality device. By way of example, and not limitation, the peripheral device 110 may be OCULUS RIFT or OCULUS QUEST (available from META), SAMSUNG GEAR VR (available from SAMSUNG and OCULUS VR), GOOGLE CARDBOARD (available from GOOGLE), HTC VIVE (available from HTC), SONY PLAYSTATION VR (available from SONY), VALVE INDEX (Available from VALVE), HP REVERB (available from HP), MICROSOFT HOLOLENS (Available from MICROSOFT), variations thereof, and/or the like. In some embodiments, the peripheral device 110 is a device with a limited input capability. For example, a limited input capability may prevent a user 113 from selecting the PHS 108 from a list of one or more available WI-FI networks and providing one or more authentication credentials (e.g., a password) to access the PHS 108. Alternatively, for example, the limited input capability may otherwise hinder the user's 113 ability to select the PHS 108 and provide the authentication credential(s). More particularly, the peripheral device 110 might not have a user-facing input component such as a touchscreen or physical keyboard, and thus may be considered to have limited input capability. Although the peripheral device 110 is described as a device without native mobile network connectivity and/or limited input capability, the peripheral device 110 may be any other device that the user 113 wants to connect to the mobile telecommunications network 104 via the PHS-enabled device 106. As such, the aforementioned capabilities of the peripheral device 110 should be construed as exemplary and not limiting in any way.

The illustrated PHS-enabled device 106 includes a PHS-enabled device WI-FI communications component 114 that enables communication via one or more WI-FI technologies, such as Institute of Electrical and Electronics Engineers ("IEEE") 802.11x technologies. Similarly, the illustrated peripheral device 110 includes a peripheral device WI-FI communications component 116. These WI-FI communications components 114, 116 enable the PHS-enabled device 106 and the peripheral device 110, respectively, to connect to and communicate with one or more WI-FI networks. More particular to the concepts and technologies disclosed herein, the PHS-enabled device WI-FI communications component 114 can create and manage the PHS 108 to which other devices, such as the peripheral device 110 using the peripheral device WI-FI communications component 116, may connect via WI-FI. In this manner, the peripheral device 110 can communicate with other networks, such as the Internet 112, through a connection to the mobile telecommunications network 104 provided by the PHS-enabled device 106 (e.g., via one or more communications components best shown in FIG. 6). This communication is generally shown as a peripheral device-to-network communication 118.

The illustrated PHS-enabled device 106 also includes a personal hotspot-enabled device short-range communications component 120. Similarly, the illustrated peripheral device 110 includes a peripheral device short-range communications component 122. The PHS-enabled device short-range communications component 120 and the peripheral device short-range communications component 122, in some embodiments, are BLUETOOTH transceivers capable of communicating with other devices via BLUETOOTH technology. Other short-range communications technologies are contemplated, such as, but not limited to, Z-WAVE, ZIGBEE, and near-field communications ("NFC"). As such, embodiments of the PHS-enabled device short-range communications component 120 and the peripheral device short-range communications component 122 as BLUETOOTH transceivers should not be construed as being limiting in any way.

Figure 5:
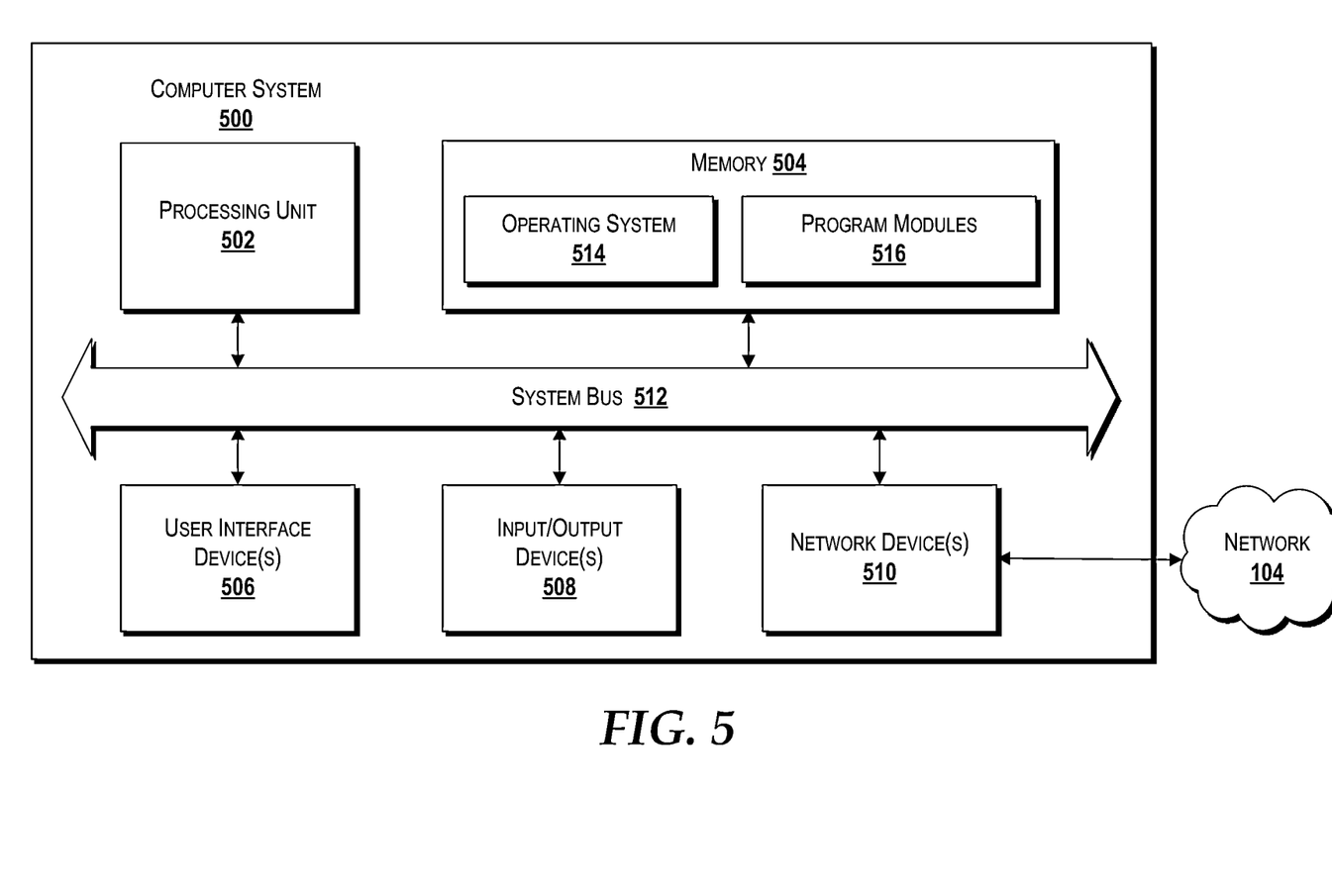
FIG. 5 is a block diagram illustrating an example computer system capable of implementing aspects of the embodiments presented herein, according to some illustrative embodiments of the concepts and technologies described herein.
Figure 6:
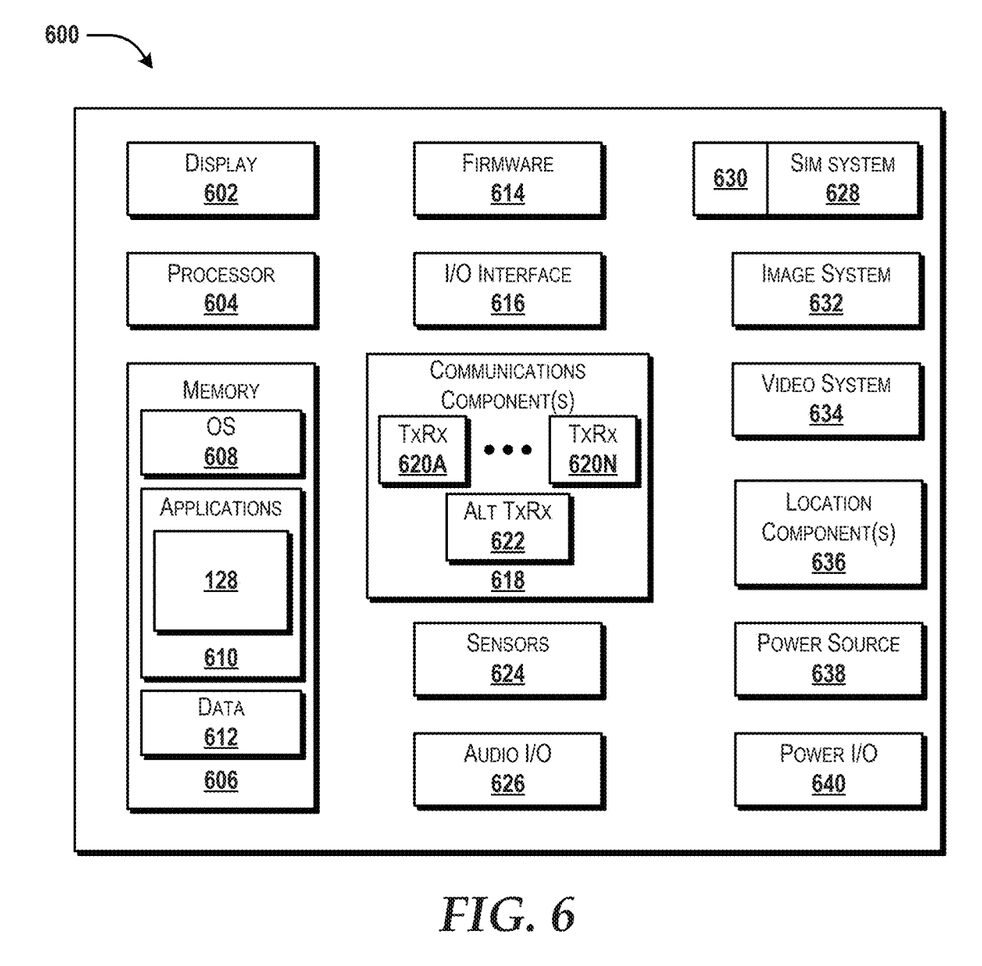
FIG. 6 is a block diagram illustrating an example mobile device capable of implementing aspects of the embodiments presented herein, according to some illustrative embodiments of the concepts and technologies described herein.

The PHS-enabled device 106 can include one or more processing components and one or more memory components (both best shown in FIGS. 5 and 6). The memory component(s) can store computer-executable instructions associated with a PHS-enabled device operating system 124. The PHS-enabled device operating system 124 is a computer program for controlling the operation of the PHS-enabled device 106. In the illustrated example, the PHS-enabled device operating system 124 includes a PHS function 125 through which the PHS-enabled device operating system 124 can instruct the PHS-enabled device WI-FI communications component 114 to create, manage, and tear down the PHS 108. The PHS-enabled device operating system 124 also can manage one or more PHS tokens 126 received from the mobile network operator 102 during an entitlement procedure 130, as will be described in greater detail below.

The memory component(s) of the PHS-enabled device 106 also can store computer-executable instructions associated with a PHS-enabled device application 128. The PHS-enabled device application 128 can include executable instructions configured to execute on top of the PHS-enabled device operating system 124 to provide various functions. In particular, the PHS-enabled device application 128 can activate a searching mode (e.g., for BLUETOOTH connections) through which the PHS-enabled device short-range communications component 120 can search for other devices, such as the peripheral device 110, with which to establish a short-range connection 132. After the short-range connection 132 is established, the peripheral device 110 can share a peripheral device ID 134 with the PHS-enabled device 106. The peripheral device ID 134 can uniquely identify the peripheral device 110. For example, the peripheral device ID 134 may be a BLUETOOTH address, a device serial number, or other unique identifier assigned to the peripheral device 110. For example, a peripheral device provider 136 may assign the unique identifier to the peripheral device 110 during manufacture, device provisioning, or at some other time. The peripheral device provider 136 may be an original equipment manufacturer ("OEM"), a retailer, or other entity that provides the peripheral device 110 to the user 113 (e.g., the user 113 may purchase, lease, or otherwise obtain, for free or for a cost, the peripheral device 110 from the peripheral device provider 136). After recognizing the peripheral device 110 and obtaining the peripheral device ID 134, the PHS-enabled device application 128 can request the PHS token 126 from the PHS-enabled device operating system 124, which can respond, in turn, with the PHS token 126 if one is available for the peripheral device. Subject to optional approval from the user 113, the PHS-enabled device operating system 124 can instruct the PHS-enabled device WI-FI communications component 114 to create the PHS 108. The PHS-enabled device application 128 can share the PHS token 126 with the peripheral device 110 via the short-range connection 132. As will be described in greater detail herein, the PHS token 126 can include the authentication credentials needed by the peripheral device 110 to authenticate to, connect to, and communicate with the PHS 108. For example, the PHS token 126 can identify a network name (e.g., a service set identifier "SSID") of the PHS 108, the security protocol used (e.g., wired equivalent privacy "WEP" or a version WI-FI protected access "WAP"), and a password.

The peripheral device 110 also can include one or more processing components and one or more memory components (both best shown in FIGS. 5 and 6). The memory component(s) can store computer-executable instructions associated with a peripheral device operating system 138 and one or more peripheral device applications 140. The peripheral device operating system 138 is a computer program for controlling the operation of the peripheral device 110. The memory component(s) also can store computer-executable instructions associated with one or more peripheral device applications 140, such as entertainment applications (e.g., video games, streaming and/or native music applications, streaming and/or native video applications, and/or the like) and/or productivity applications (e.g., web browser applications, word processing applications, email applications, and/or the like).

In some embodiments, the mobile network operator 102 and the peripheral device provider 136 can coordinate to define a seamless PHS agreement 142. The seamless PHS agreement 142 can specify one or more peripheral devices, such as the peripheral device 110, for which one or more PHS tokens, such as the PHS token 126, can be created. Alternatively, the seamless PHS agreement 142 may be device agnostic, in which case the seamless PHS agreement 142 can specify one or more peripheral device applications, such as the peripheral device application(s) 140, for which one or more PHS tokens, such as the PHS token 126, can be created. The seamless PHS agreement 142 can specify both one or more peripheral devices and one or more peripheral device applications. The seamless PHS agreement 142 may specify an expiration date for the PHS token 126. The seamless PHS agreement 142 may specify a time constraint for how long the PHS 108 can be active (e.g., cumulative total or per activation). The seamless PHS agreement 142 may specify a maximum number of activations of the PHS 108 that are valid such that when the maximum number is reached, the PHS token 126 expires. Other conditions that define the validity of the PHS token 126 may be defined in the seamless PHS agreement 142. The seamless PHS agreement 142 may be tied to a service feature (e.g., PHS service feature) provided by the mobile network operator 102. This service feature may be associated with a service plan that defines the service(s) provided by the mobile network operator 102 to the user 113 and his or her PHS-enabled device 106. Those skilled in the art will appreciate that the seamless PHS agreement 142 may have conditions not specifically described herein. It should be understood that the conditions described herein are not intended to be limiting in any way.

As part of the seamless PHS agreement 142, the mobile network operator 102 can generate the PHS token 126. In the illustrated example, the PHS token 126 can be generated by a PHS token generator 144. In some embodiments, the PHS token generator 144 can generate one or more PHS tokens, such as the PHS token 126. The PHS token generator 144 may generate an identifier for the PHS token 126 using a random number generator, a pseudo-random number generator, a random alphanumeric generator, a pseudo-random alphanumeric generator, a selection from a list of predetermined PHS tokens, or the like. This identifier (not shown) can be used to track the PHS token 126. As mentioned above, the PHS token 126 also can include authentication credentials that can be defined by the mobile network operator 102. The PHS token generator 144 may define a random SSID and password to be associated with the seamless PHS token 126. Alternatively, the authentication credentials may be assigned based upon the PHS agreement 142. For example, the peripheral device provider 136 or the mobile network operator 102 may specify the SSID and password to be used.

The mobile network operator 102 can provide the PHS token 126 to the PHS-enabled device 106 during the entitlement procedure 130. The entitlement procedure 130 may occur one time such as when the PHS-enabled device 106 is provisioned for service with the mobile network operator 102. The entitlement procedure 130 may occur periodically such as monthly or other period in accordance with a service billing cycle. The entitlement procedure 130 may be on-demand such as in response to a request made by the mobile network operator 102, the user 113, the peripheral device provider 136, or some other entity. The entitlement procedure 130 may occur with some other frequency defined, for example, in the seamless PHS agreement 142. The PHS-enabled device 106 can receive the PHS token 126 and store the PHS token 126 in a memory component that is accessible by the PHS-enabled device operating system 124.

Figure 2:
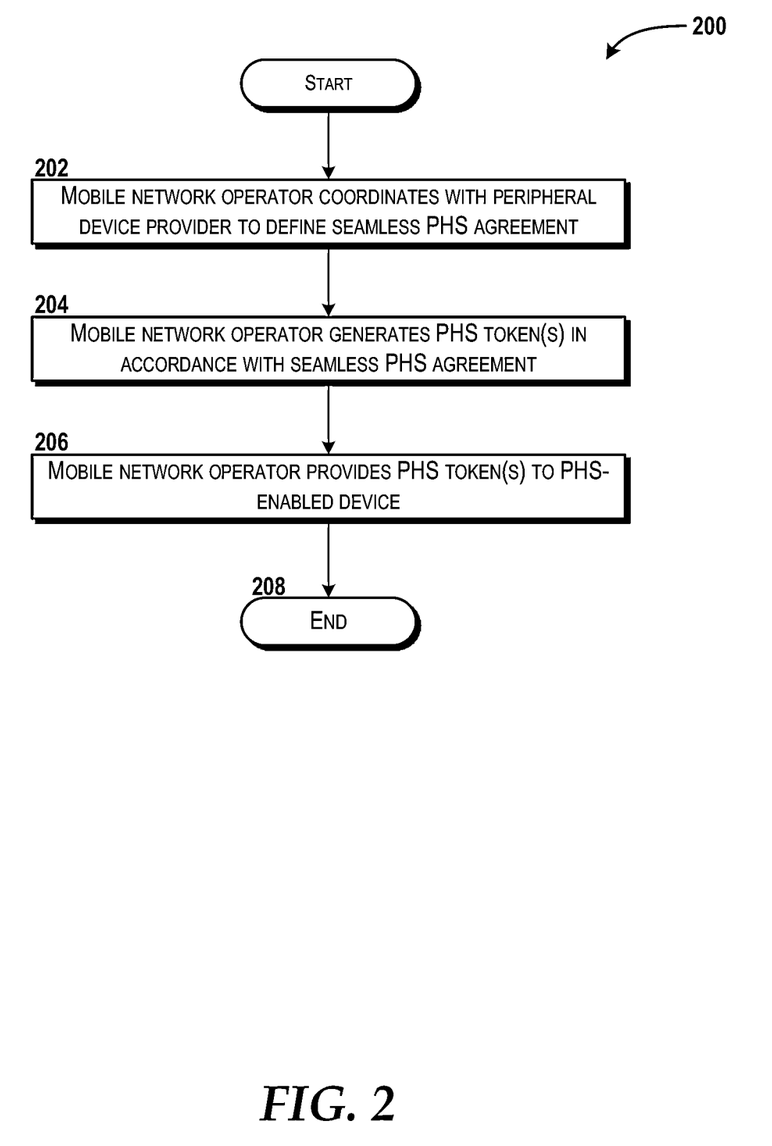
FIG. 2 is a flow diagram showing aspects of a method for establishing a seamless PHS agreement, according to an illustrative embodiment of the concepts and technologies described herein.

Turning now to FIG. 2, aspects of a method 200 for establishing a seamless personal hotspot agreement will be described, according to an illustrative embodiment of the concepts and technologies described herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the PHS-enabled device 106, the peripheral device 110, and/or one or more computing systems and/or devices associated with the mobile network operator 102, to perform one or more operations and/or causing the processor to direct other components of the computing system or device to perform one or more of the operations.

For purposes of illustrating and describing the concepts of the present disclosure, the methods disclosed herein are described as being performed by a system associated with the mobile network operator 102 or the PHS-enabled device 106 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the mobile network operator 102 coordinates with the peripheral device provider 136 to define the seamless PHS agreement 142. The seamless PHS agreement 142 can specify one or more peripheral devices, such as the peripheral device 110, for which one or more PHS tokens, such as the PHS token 126, can be created. Alternatively, the seamless PHS agreement 142 may be device agnostic, in which case the seamless PHS agreement 142 can specify one or more peripheral device applications, such as the peripheral device application(s) 140, for which one or more PHS tokens, such as the PHS token 126, can be created. The seamless PHS agreement 142 can specify both one or more peripheral devices and one or more peripheral device applications. The seamless PHS agreement 142 may specify an expiration date for the PHS token 126. The seamless PHS agreement 142 may specify a time constraint for how long the PHS 108 can be active (e.g., cumulative total or per activation). The seamless PHS agreement 142 may specify a maximum number of activations of the PHS 108 that are valid such that when the maximum number is reached, the PHS token 126 expires. Other conditions that define the validity of the PHS token 126 may be defined in the seamless PHS agreement 142. The seamless PHS agreement 142 may be tied to a service feature (e.g., PHS service feature) provided by the mobile network operator 102. This service feature may be associated with a service plan that defines the service(s) provided by the mobile network operator 102 to the user 113 and his or her PHS-enabled device 106. Those skilled in the art will appreciate that the seamless PHS agreement 142 may have conditions not specifically described herein. It should be understood that the conditions described herein are not intended to be limiting in any way.

From operation 202, the method 200 proceeds to operation 204. At operation 204, the mobile network operator 102 generates, via execution of the PHS token generator 144, one or more PHS tokens, such as the PHS token 126, in accordance with the seamless PHS agreement 142. The PHS token generator 144 may generate an identifier for the PHS token 126 using a random number generator, a pseudo-random number generator, a random alphanumeric generator, a pseudo-random alphanumeric generator, a selection from a list of predetermined PHS tokens, or the like. This identifier (not shown) can be used to track the PHS token 126. As mentioned above, the PHS token 126 also can include authentication credentials that can be defined by the mobile network operator 102. The PHS token generator 144 also may define a random SSID and password to be associated with the PHS token 126. Alternatively, the authentication credentials may be assigned based upon the PHS agreement 142. For example, the peripheral device provider 136 or the mobile network operator 102 may specify the SSID and password to be used.

From operation 204, the method 200 proceeds to operation 206. At operation 206, the mobile network operator 102 provides the PHS token 126 to the PHS-enabled device 106 during the entitlement procedure 130. The entitlement procedure 130 may occur one time such as when the PHS-enabled device 106 is provisioned for service with the mobile network operator 102. The entitlement procedure 130 may occur periodically such as monthly or other period in accordance with a service billing cycle. The entitlement procedure 130 may be on-demand such as in response to a request made by the mobile network operator 102, the user 113, the peripheral device provider 136, or some other entity. The entitlement procedure 130 may occur with some other frequency defined, for example, in the seamless PHS agreement 142. The PHS-enabled device 106 can receive the PHS token 126 and store the PHS token 126 in a memory component that is accessible by the PHS-enabled device operating system 124.

From operation 206, the method 200 proceeds to operation 208. The method 200 can end at operation 208.

Figure 3:
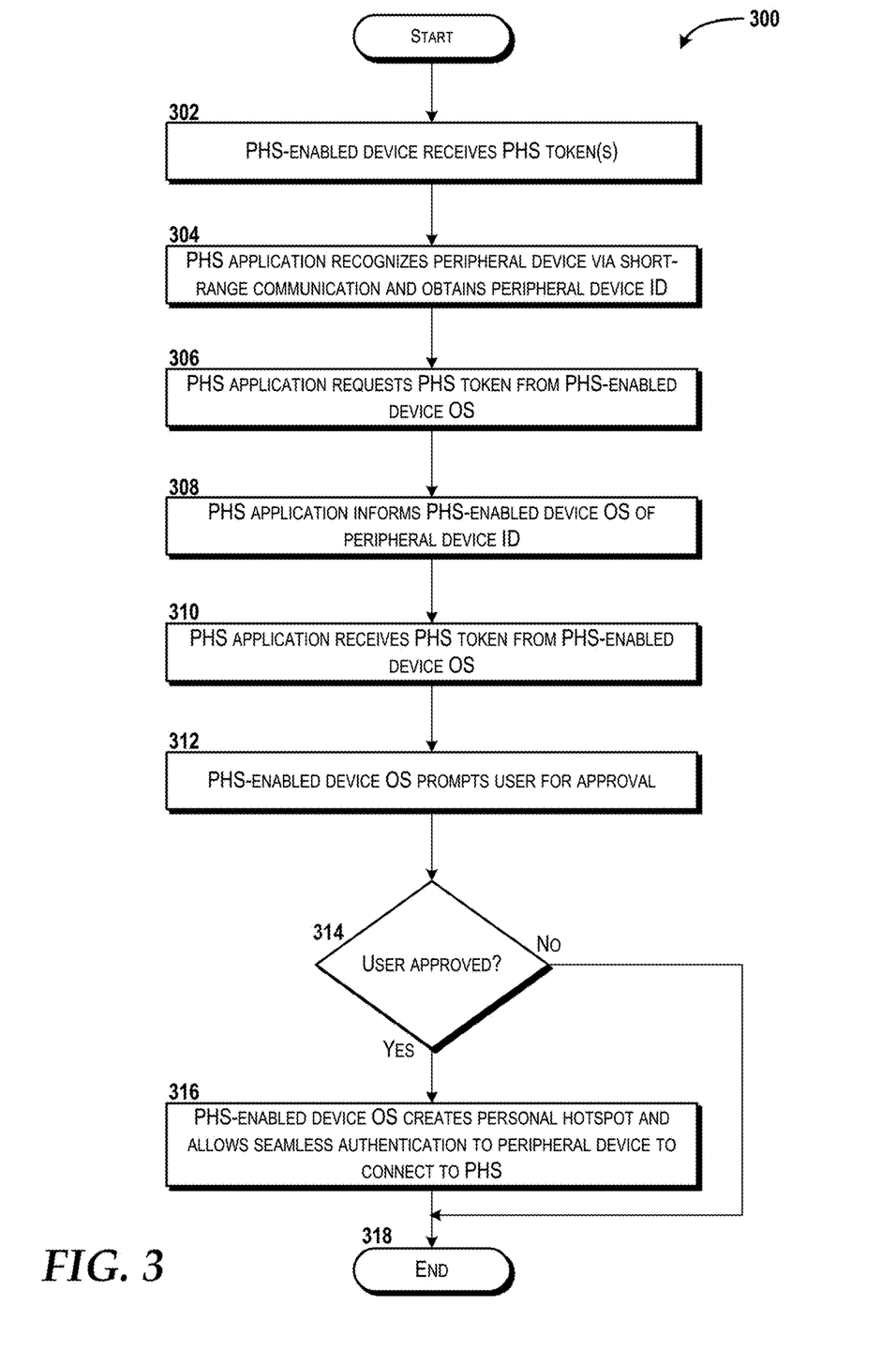
FIG. 3 is a flow diagram showing aspects of a method for providing seamless PHS connectivity via a PHS token, according to an illustrative embodiment of the concepts and technologies described herein.

Turning now to FIG. 3, a method 300 for providing seamless PHS connectivity via a PHS token 126 will be described, according to an illustrative embodiment. The method 300 begins and proceeds to operation 302. At operation 302, the PHS-enabled device 106 receives the PHS token(s) 126 from the mobile network operator 102 in accordance with the seamless PHS agreement 142. The PHS-enabled device 106 can store the PHS token(s) 126 in a memory component accessible only by the PHS-enabled device operating system 124, and particularly by the PHS function 125 of the PHS-enabled device operating system 124. Alternative storage options are contemplated.

From operation 302, the method 300 proceeds to operation 304. At operation 304, the PHS-enabled device application 128 recognizes the peripheral device 110 via short-range communication (e.g., BLUETOOTH), and obtains the peripheral device ID 134 associated with the peripheral device 110. From operation 304, the method 300 proceeds to operation 306. At operation 306, the PHS-enabled device application 128 requests the PHS token 126 from the PHS-enabled device operating system 124. From operation 306, the method 300 proceeds to operation 308. At operation 308, the PHS-enabled device application 128 informs the PHS-enabled device operating system 124 of the peripheral device identification 134. The PHS-enabled device operating system 124 can compare the peripheral device identification 134 to the PHS token(s) 126 received from the mobile network operator 102. The remaining operations assume that a PHS token 126 associated with the peripheral device identification 134 is found. Although operations 306 and 308 are shown separately, these operations can be performed simultaneously. For example, the request for the PHS token 126 can include the peripheral device identification 134.

From operation 308, the method 300 proceeds to operation 310. At operation 310, the PHS-enabled device application 128 receives the PHS token 126 from the PHS-enabled device operating system 124. From operation 310, the method 300 proceeds to operation 312. At operation 312, the PHS-enabled device operating system 124, optionally, can prompt the user 113 for approval to allow the PHS-enabled device operating system 124 to facilitate seamless authentication for the peripheral device 110 to connect to the personal hotspot 108. In some embodiments, the PHS-enabled device operating system 124 uses a native operating system feature to request approval. For example, the PHS-enabled device operating system 124 can present a message prompt asking the user 113 to approve or deny. The message prompt may be accompanied by a request for the user 113 to enter their user credentials (e.g., password, passcode, or biometric input such as facial recognition or fingerprint recognition). The user 113 may establish a setting to pre-approve any PHS-related requests or specific requests associated with particular peripheral devices, such as the peripheral device 110.

From operation 312, the method 300 proceeds to operation 314. At operation 314, the PHS-enabled device operating system 124 determines whether the user 113 has provided his or her approval. If so, the method 300 proceeds to operation 316. At operation 316, the PHS-enabled device operating system 124, via the PHS function 125, creates the PHS 108 and allows seamless authentication for the peripheral device 110 to connect to the PHS 108 using the authentication credentials in the PHS token 126.

From operation 316, the method 300 proceeds to operation 318. The method 300 can end at operation 318. Turning back to operation 314, if the PHS-enabled device operating system 124 determines that the user 113 has not provided his or her approval, the method 300 can proceed to operation 318 where the operation 300 can end.

Figure 4:
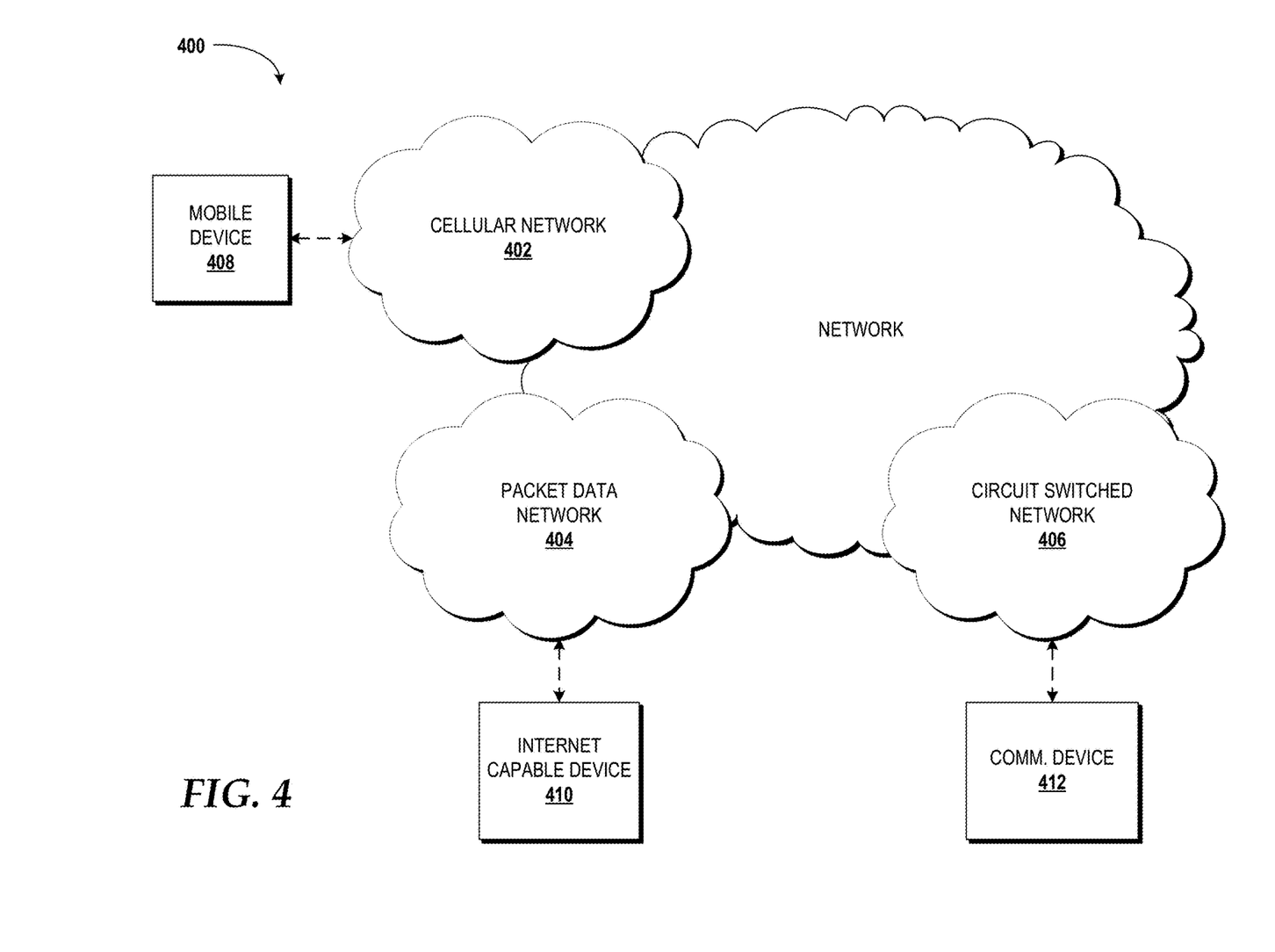
FIG. 4 schematically illustrates a network, according to an illustrative embodiment of the concepts and technologies described herein.

Turning now to FIG. 4, details of a network 400 are illustrated, according to an illustrative embodiment. In some embodiments, at least a portion of the mobile telecommunications network 104 shown in FIG. 1 can be configured the same as or similar to the network 400. The network 400 includes a cellular network 402, a packet data network 404, and a circuit switched network 406 (e.g., a public switched telephone network). The cellular network 402 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, the PHS-enabled device 106, a mobile device 600 (shown in FIG. 6), a cellular telephone, a user equipment, a mobile terminal, a PDA, a laptop computer, a handheld computer, and combinations thereof, can be operatively connected to the cellular network 402. The cellular network 402 can be configured as a Global System for Mobile communications ("GSM") network and can provide data communications via General Packet Radio Service ("GPRS") and/or Enhanced Data rates for Global Evolution ("EDGE"). Additionally, or alternatively, the cellular network 402 can be configured as a 3G Universal Mobile Telecommunications System ("UMTS") network and can provide data communications via the High-Speed Packet Access ("HSPA") protocol family, for example, High-Speed Downlink Packet Access ("HSDPA"), High-Speed Uplink Packet Access ("HSUPA") (also known as Enhanced Uplink "EUL"), and HSPA+. The cellular network 402 also is compatible with mobile communications standards such as Long-Term Evolution ("LTE"), or the like, as well as evolved and future mobile standards.

The packet data network 404 includes various systems, devices, servers, computers, databases, and other devices in communication with one another, as is generally known. In some embodiments, the packet data network 404 is or includes one or more WI-FI networks, each of which can include one or more WI-FI access points, routers, switches, and other WI-FI network components. The packet data network 404 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system ("POTS"). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable systems/devices 410 can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410.

Turning now to FIG. 5, a block diagram illustrating a computer system 500 configured to provide the functionality in accordance with various embodiments of the concepts and technologies disclosed herein. The systems, devices, and other components disclosed herein can utilize, at least in part, an architecture that is the same as or at least similar to the architecture of the computer system 500. In some embodiments, the PHS-enabled device 106, the peripheral device 110, one or more mobile network operator systems (not shown), and/or other systems and/or devices described herein can be configured like the computer system 500. It should be understood, however, that modification to the architecture may be made to facilitate certain interactions among elements described herein.

The computer system 500 includes a processing unit 502, a memory 504, one or more user interface devices 506, one or more input/output ("I/O") devices 508, and one or more network devices 510, each of which is operatively connected to a system bus 512. The system bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 504 communicates with the processing unit 502 via the system bus 512. In some embodiments, the memory 504 is operatively connected to a memory controller (not shown) that enables communication with the processing unit 502 via the system bus 512. The illustrated memory 504 includes an operating system 514 and one or more program modules 516. The operating system 514 can include, but is not limited to, the PHS-enabled device operating system 124, the peripheral device operating system 138, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 516 may include various software and/or program modules to perform the various operations described herein. In some embodiments, for example, the program modules 516 can include the PHS token generator 144, the PHS-enabled device application 128, the peripheral device application(s) 140, and/or other program modules. These and/or other programs can be embodied in computer-readable media containing instructions that, when executed by the processing unit 502, in some embodiments, may perform and/or facilitate performance of the methods 200, 300 described in detail above with respect to FIGS. 2 and 3. According to some embodiments, the program modules 516 may be embodied in hardware, software, firmware, or any combination thereof. Although not shown in FIG. 5, it should be understood that the memory 504 also can be configured to store the PHS token(s) 126, the seamless PHS agreement 142, the peripheral device ID 134, and/or other data disclosed herein, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium," "computer-readable storage medium," and variations thereof does not include waves or signals per se and/or communication media, and therefore should be construed as being directed to "non-transitory" media only.

The user interface devices 506 may include one or more devices with which a user accesses the computer system 500. The user interface devices 506 may include, but are not limited to, computers, servers, PDAs, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer. In some embodiments, the I/O devices 508 can be used for manual controls for operations to exercise under certain emergency situations.

The network devices 510 enable the computer system 500 to communicate with other networks or remote systems via a network, such as the mobile telecommunications network 104. Examples of the network devices 510 include, but are not limited to, a modem, a radio frequency ("RF") or infrared ("IR") transceiver, a telephonic interface, a bridge, a router, or a network card. The network 518 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 104 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, or any other mobile network and/or wireline network.

Turning now to FIG. 6, an illustrative mobile device 600 and components thereof will be described. In some embodiments, the PHS-enabled device 106 (shown in FIG. 1) can be configured like the mobile device 600. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608 (e.g., the PHS-enabled device operating system 124), one or more applications 610 (e.g., the PHS-enabled device application 128), other computer-executable instructions stored in a memory 606, or the like. In some embodiments, the applications 610 also can include a user interface ("UP") application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid the user 113 with entering/deleting data, entering and setting local credentials (e.g., user IDs and passwords) for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. The data 612 can include, for example, one or more identifiers, and/or other applications or program modules. According to various embodiments, the applications 610 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, 5G, and greater generation technology standards. Moreover, the communications component 618 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 618 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like. The alternative transceiver 622 can include the PHS-enabled device short-range communications component 120.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Based on the foregoing, it should be appreciated that concepts and technologies directed to seamless PHS connectivity via PHS tokens have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
receiving, by a personal hotspot-enabled device comprising a processor executing an operating system and a personal hotspot application, a personal hotspot token;
recognizing, by the personal hotspot application via a short-range communication component, a device identification associated with a peripheral device operating in proximity to the personal hotspot-enabled device;
requesting, by the personal hotspot application, the personal hotspot token from the operating system;
informing, by the personal hotspot application, the operating system of the device identification;
receiving, by the personal hotspot application, the personal hotspot token from the operating system;
prompting, by the operating system, a user to provide an approval to allow the peripheral device to access a personal hotspot;
receiving, by the operating system, the approval from the user; and
in response to receiving the approval,
creating, by the operating system via a personal hotspot function, the personal hotspot, and
automatically authenticating, by the operating system, the peripheral device to connect to the personal hotspot using the personal hotspot token.

2. The method of claim 1, wherein the personal hotspot token is specific to the peripheral device.

3. The method of claim 1, wherein the personal hotspot token is specific to an original equipment manufacturer associated with the peripheral device.

4. The method of claim 1, wherein the peripheral device comprises an extended reality device.

5. The method of claim 1, wherein the peripheral device comprises a device with a limited input capability.

6. The method of claim 1, wherein receiving, by the personal hotspot-enabled device, the personal hotspot token comprises receiving, by the personal hotspot-enabled device, the personal hotspot token in accordance with a personal hotspot agreement between a mobile network operator and a peripheral device provider.

7. A personal hotspot-enabled device comprising:
a short-range communication component;
a processor; and
a memory comprising an operating system and a personal hotspot application together comprising computer-executable instructions that, when executed by the processor, cause the processor to perform operations comprising
receiving a personal hotspot token,
recognizing, by the personal hotspot application, via the short-range communication component, a device identification associated with a peripheral device operating in proximity to the personal hotspot-enabled device,
requesting, by the personal hotspot application, the personal hotspot token from the operating system,
informing, by the personal hotspot application, the operating system of the device identification,
receiving, by the personal hotspot application, the personal hotspot token from the operating system,
prompting, by the operating system, a user to provide an approval to allow the peripheral device to access a personal hotspot,
receiving, by the operating system, the approval from the user, and
in response to receiving the approval,
creating, by the operating system via a personal hotspot function, the personal hotspot, and
automatically authenticating, by the operating system, the peripheral device to connect to the personal hotspot using the personal hotspot token.

8. The personal hotspot-enabled device of claim 7, wherein the personal hotspot token is specific to the peripheral device.

9. The personal hotspot-enabled device of claim 7, wherein the personal hotspot token is specific to an original equipment manufacturer associated with the peripheral device.

10. The personal hotspot-enabled device of claim 7, wherein the peripheral device comprises an extended reality device.

11. The personal hotspot-enabled device of claim 7, wherein the peripheral device comprises a device with a limited input capability.

12. The personal hotspot-enabled device of claim 7, wherein receiving the personal hotspot token comprises receiving the personal hotspot token in accordance with a personal hotspot agreement between a mobile network operator and a peripheral device provider.

13. A computer-readable storage medium comprising computer-executable instructions of an operating system and a personal hotspot application that, when executed by a processor of a personal hotspot-enabled device, cause the processor to perform operations comprising:
    receiving a personal hotspot token;
    recognizing, by the personal hotspot application via a short-range communication component, a device identification associated with a peripheral device operating in proximity to the personal hotspot-enabled device;
    requesting, by the personal hotspot application, the personal hotspot token from the operating system;
    informing, by the personal hotspot application, the operating system of the device identification;
    receiving, by the personal hotspot application, the personal hotspot token from the operating system;
    prompting, by the operating system, a user to provide an approval to allow the peripheral device to access a personal hotspot;
    receiving, by the operating system, the approval from the user; and
    in response to receiving the approval,
        creating, by the operating system via a personal hotspot function, the personal hotspot; and
        automatically authenticating, by the operating system, the peripheral device to connect to the personal hotspot using the personal hotspot token.

14. The computer-readable storage medium of claim 13, wherein the personal hotspot token is specific to the peripheral device.

15. The computer-readable storage medium of claim 13, wherein the personal hotspot token is specific to an original equipment manufacturer associated with the peripheral device.

16. The computer-readable storage medium of claim 13, wherein the peripheral device comprises an extended reality device or a device with a limited input capability.

17. The computer-readable storage medium of claim 13, wherein receiving the personal hotspot token comprises receiving the personal hotspot token in accordance with a personal hotspot agreement between a mobile network operator and a peripheral device provider.

* * * * *